US011125332B2

(12) United States Patent
Hu et al.

(10) Patent No.: US 11,125,332 B2
(45) Date of Patent: Sep. 21, 2021

(54) SEALING PLUG ASSEMBLY

(71) Applicant: TECHNOLOGY ON PROTOTYPING ULTIMATE CO., LTD., Kaohsiung (TW)

(72) Inventors: Hui Wen Hu, Kaohsiung (TW); Ting Yu Chen, Kaohsiung (TW)

(73) Assignee: TECHNOLOGY ON PROTOTYPING ULTIMATE CO., LTD., Kaohsiung (TW)

( * ) Notice: Subject to any disclaimer, the term of this patent is extended or adjusted under 35 U.S.C. 154(b) by 237 days.

(21) Appl. No.: 16/392,937

(22) Filed: Apr. 24, 2019

(65) Prior Publication Data

US 2020/0207521 A1 Jul. 2, 2020

(30) Foreign Application Priority Data

Dec. 27, 2018 (TW) ................................ 107147433

(51) Int. Cl.
*F16J 15/02* (2006.01)
*B65D 53/02* (2006.01)
(Continued)

(52) U.S. Cl.
CPC ............ *F16J 15/025* (2013.01); *B65D 53/02* (2013.01); *F16J 13/02* (2013.01); *F16J 15/166* (2013.01); *F16J 15/022* (2013.01); *F16J 15/104* (2013.01)

(58) Field of Classification Search
CPC .. F16J 13/02; F16J 13/14; F16J 15/022; F16J 15/104; F16J 15/166; F16J 15/48; B65D 53/02
See application file for complete search history.

(56) References Cited

U.S. PATENT DOCUMENTS 3,419,180 A * 12/1968 Homrig ..................... F16J 13/12
 220/235
4,143,586 A * 3/1979 Zitting ................. F16J 15/3204
 277/437

(Continued)

FOREIGN PATENT DOCUMENTS

CN 201233299 Y 5/2009
CN 102588610 A 7/2012
CN 103968071 A 8/2014

OTHER PUBLICATIONS

Sep. 19, 2019, Office Action issued by the Taiwan Intellectual Property Office in the corresponding Taiwanese Patent Application No. 107147433.

*Primary Examiner* — Nicholas L Foster
(74) *Attorney, Agent, or Firm* — Kenja IP Law PC

(57) ABSTRACT

The disclosure provides a sealing plug assembly including a plug body, a guide ring, a first sealing ring and an elastic component. The plug body has an annular outer surface having a plug side and an exposed side opposite each other and a first annular recess located at the annular outer surface and located between the plug side and the exposed side. The guide ring is sleeved on the plug body and located in the first annular recess. The guide ring has a first inclined surface. The first sealing ring is sleeved on the plug body and located in the first annular recess. The first sealing ring is located farther away from the exposed side of the annular outer surface than the guide ring. The first sealing ring has a second inclined surface matching the first inclined surface. The elastic component is sleeved on the first sealing ring.

14 Claims, 8 Drawing Sheets

(51) Int. Cl.
  *F16J 15/16* (2006.01)
  *F16J 13/02* (2006.01)
  *F16J 15/10* (2006.01)

(56) References Cited

U.S. PATENT DOCUMENTS

| | | | | |
|---|---|---|---|---|
| 4,268,045 | A * | 5/1981 | Traub | F16F 9/363 |
| | | | | 277/589 |
| 4,346,903 | A * | 8/1982 | Heiermann | F16J 15/56 |
| | | | | 277/452 |
| 4,443,016 | A * | 4/1984 | Schungel | F16J 10/02 |
| | | | | 220/240 |
| 4,562,798 | A * | 1/1986 | van Os | F02F 1/24 |
| | | | | 123/193.3 |
| 4,595,038 | A * | 6/1986 | Wege | F15B 1/24 |
| | | | | 138/31 |
| 4,982,889 | A * | 1/1991 | Eardley | F01D 11/005 |
| | | | | 277/579 |
| 6,736,407 | B2 * | 5/2004 | Tremoulet, Jr. | F16J 15/121 |
| | | | | 220/234 |
| 7,971,852 | B2 * | 7/2011 | Otsubo | F16L 55/1108 |
| | | | | 251/144 |
| 9,388,901 | B2 | 7/2016 | Nuennerich et al. | |
| 9,752,680 | B2 | 9/2017 | Tárrago Mingo et al. | |
| 10,487,982 | B2 * | 11/2019 | Sawai | F17C 1/16 |
| 10,890,256 | B2 * | 1/2021 | Sawai | F17C 1/00 |
| 2003/0122322 | A1 * | 7/2003 | Tremoulet, Jr. | F16J 15/121 |
| | | | | 277/630 |
| 2008/0111322 | A1 * | 5/2008 | Otsubo | F16L 55/1108 |
| | | | | 277/654 |
| 2010/0258311 | A1 * | 10/2010 | Craig | E21B 29/10 |
| | | | | 166/277 |
| 2015/0042048 | A1 * | 2/2015 | Nuennerich | F16J 15/166 |
| | | | | 277/642 |
| 2016/0245406 | A1 * | 8/2016 | Ryther | F16J 15/3208 |
| 2019/0049067 | A1 * | 2/2019 | Sawai | F17C 1/16 |
| 2019/0316681 | A1 * | 10/2019 | Sawai | F17C 1/00 |

* cited by examiner

SEALING PLUG ASSEMBLY

CROSS-REFERENCE TO RELATED APPLICATIONS

This non-provisional application claims priority under 35 U.S.C. § 119(a) on Patent Application No(s). 107147433 filed in Taiwan, R.O.C on Dec. 27, 2018, the entire contents of which are hereby incorporated by reference.

TECHNICAL FIELD

The disclosure relates a sealing plug assembly, more particularly to a sealing plug assembly having a guide ring and a first sealing ring respectively having two matching inclined surfaces.

BACKGROUND

In order to extend food expiration dates, high pressure processing (HPP) is provided. The so-called high pressure processing manner is to package food in a soft container, and then use water as a medium to pressurize the internal space of the soft container to a certain value at a proper temperature and time period. By doing so, food can be well-preserved and sterilized.

In general, a pressure tank for performing the high pressure processing is sealed by a sealing plug, and the sealing plug is used to prevent the leakage of liquid inside the pressure tank.

SUMMARY OF THE INVENTION

One embodiment provides a sealing plug assembly. The sealing plug assembly includes a plug body, a guide ring, a first sealing ring and an elastic component. The plug body has an annular outer surface and a first annular recess. The annular outer surface has a plug side and an exposed side opposite each other. The first annular recess is located at the annular outer surface and is located between the plug side and the exposed side. The guide ring is sleeved on the plug body and located in the first annular recess. The guide ring has a first inclined surface. The first inclined surface has a first side and a second side opposite each other. The first side is located closer to the exposed side of the annular outer surface than the second side, and a distance between the first side and a central line of the plug body is larger than a distance between the second side and the central line of the plug body. The first sealing ring is sleeved on the plug body and located in the first annular recess. The first sealing ring is located farther away from the exposed side of the annular outer surface than the guide ring. The first sealing ring has a second inclined surface, and the second inclined surface matches the first inclined surface. The elastic component is sleeved on the first sealing ring.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
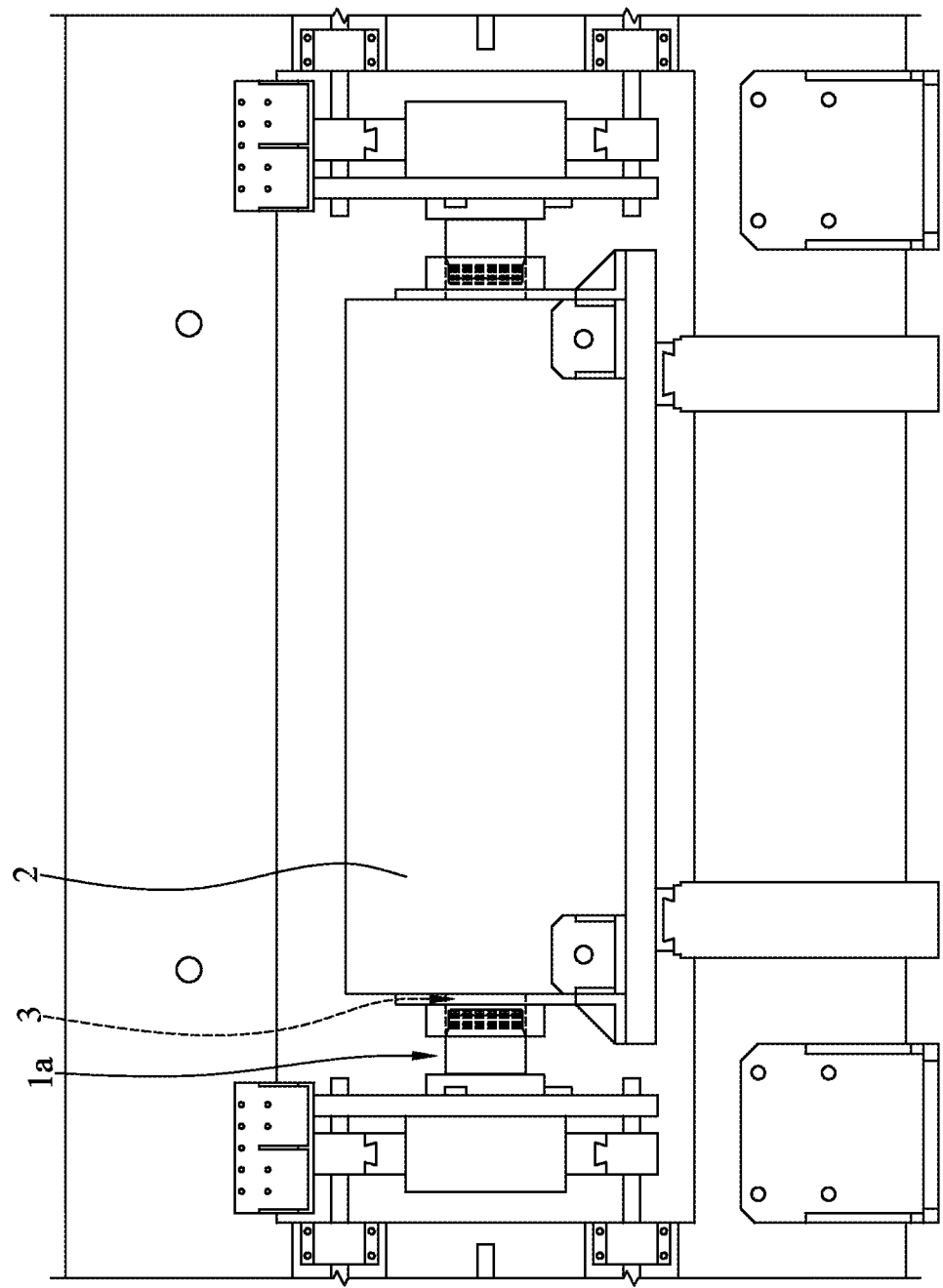
FIG. 1 is a schematic view of a sealing plug assembly and a pressure tank according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
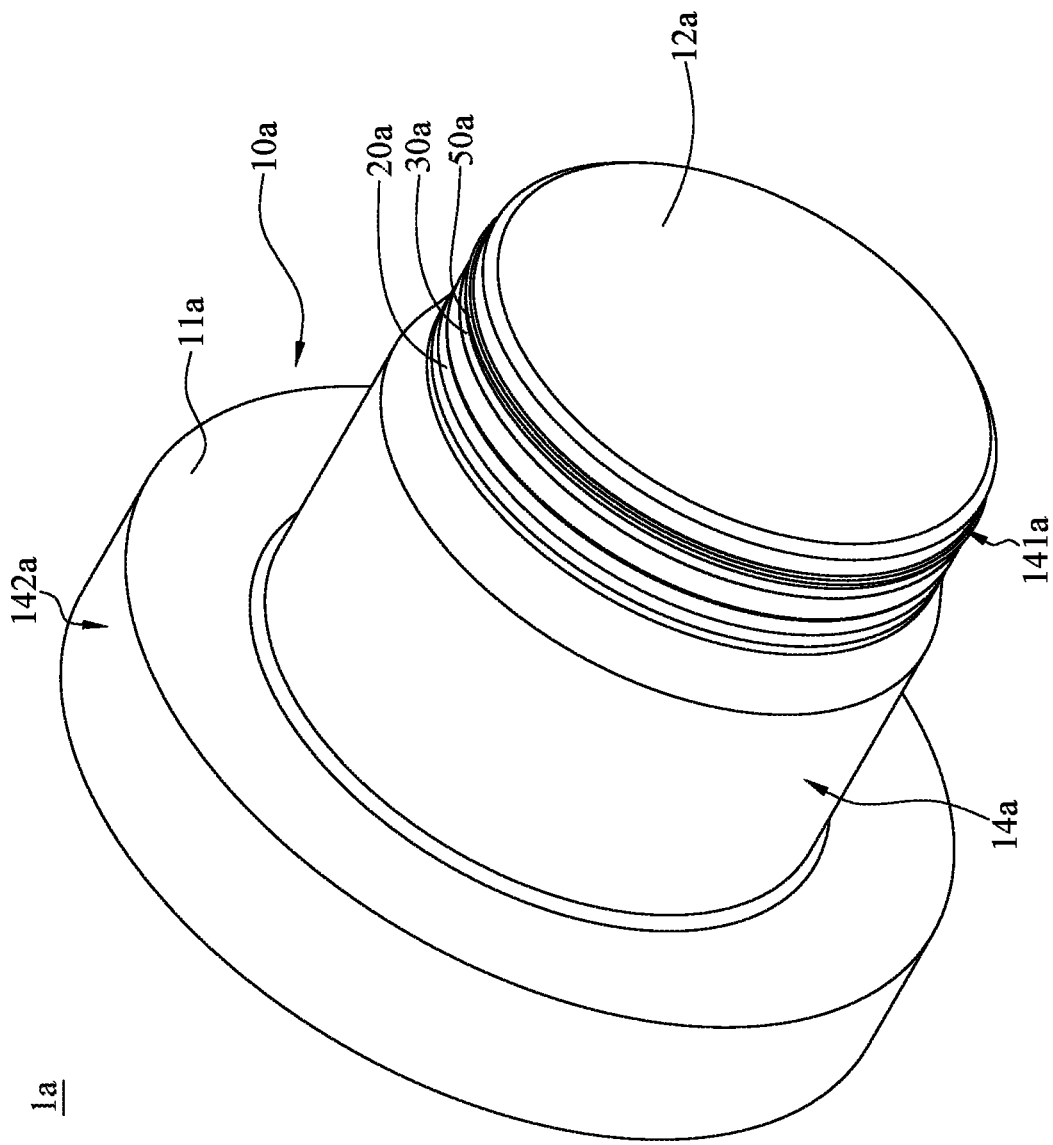
FIG. 2 is a perspective view of the sealing plug assembly in FIG. 1.

Please refer to FIG. 1 and FIG. 2. FIG. 1 is a schematic view of a sealing plug assembly and a pressure tank according to a first embodiment of the disclosure, and FIG. 2 is a perspective view of the sealing plug assembly in FIG. 1.

This embodiment provides a sealing plug assembly 1a. The sealing plug assembly 1a is configured to seal an opening 3 of a pressure tank 2. The pressure tank 2 is, for example, an equipment for processing food with high-pressure liquid (e.g., water).

Figure 3:
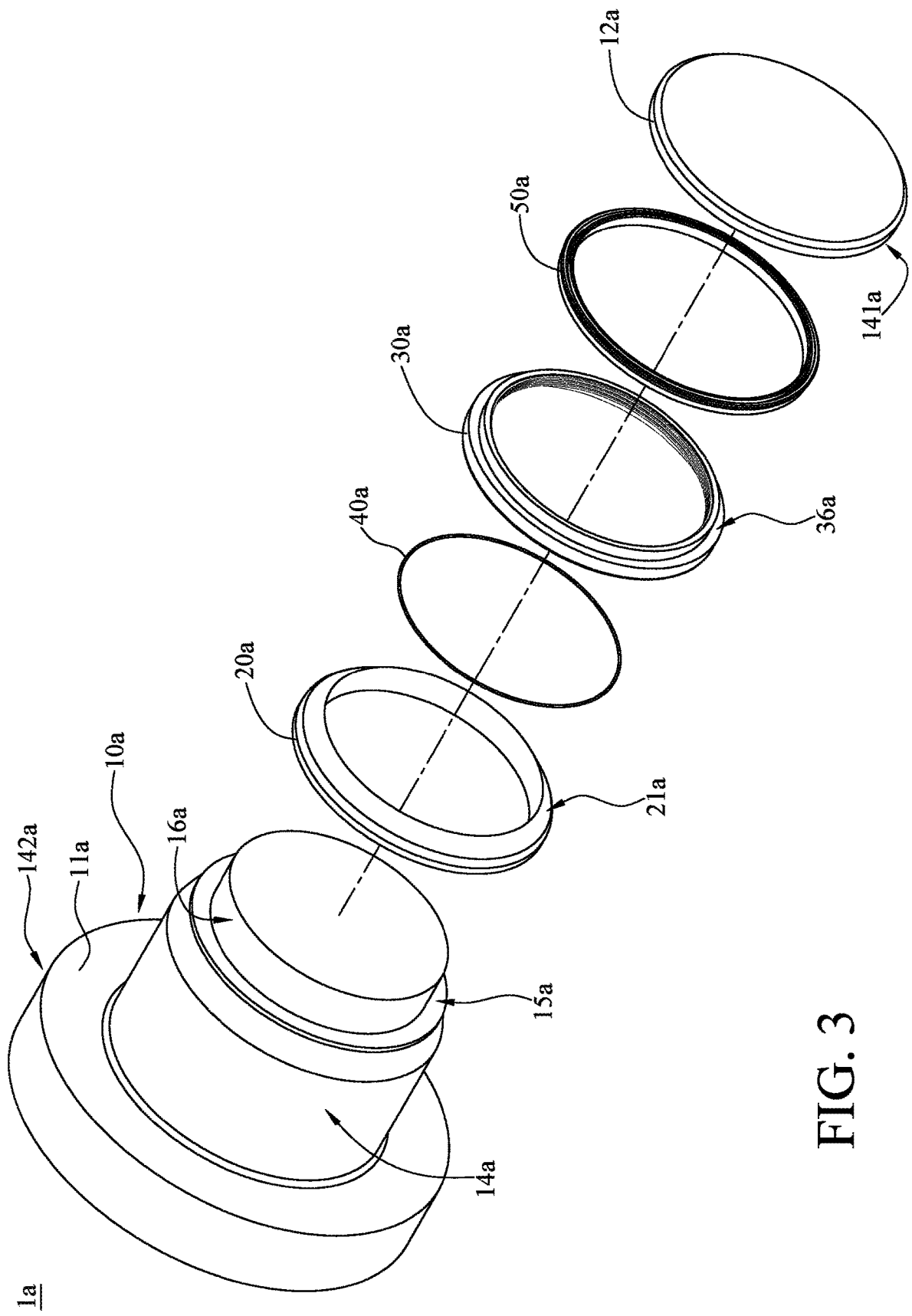
FIG. 3 is an exploded view of the sealing plug assembly in FIG. 2.
Figure 4:
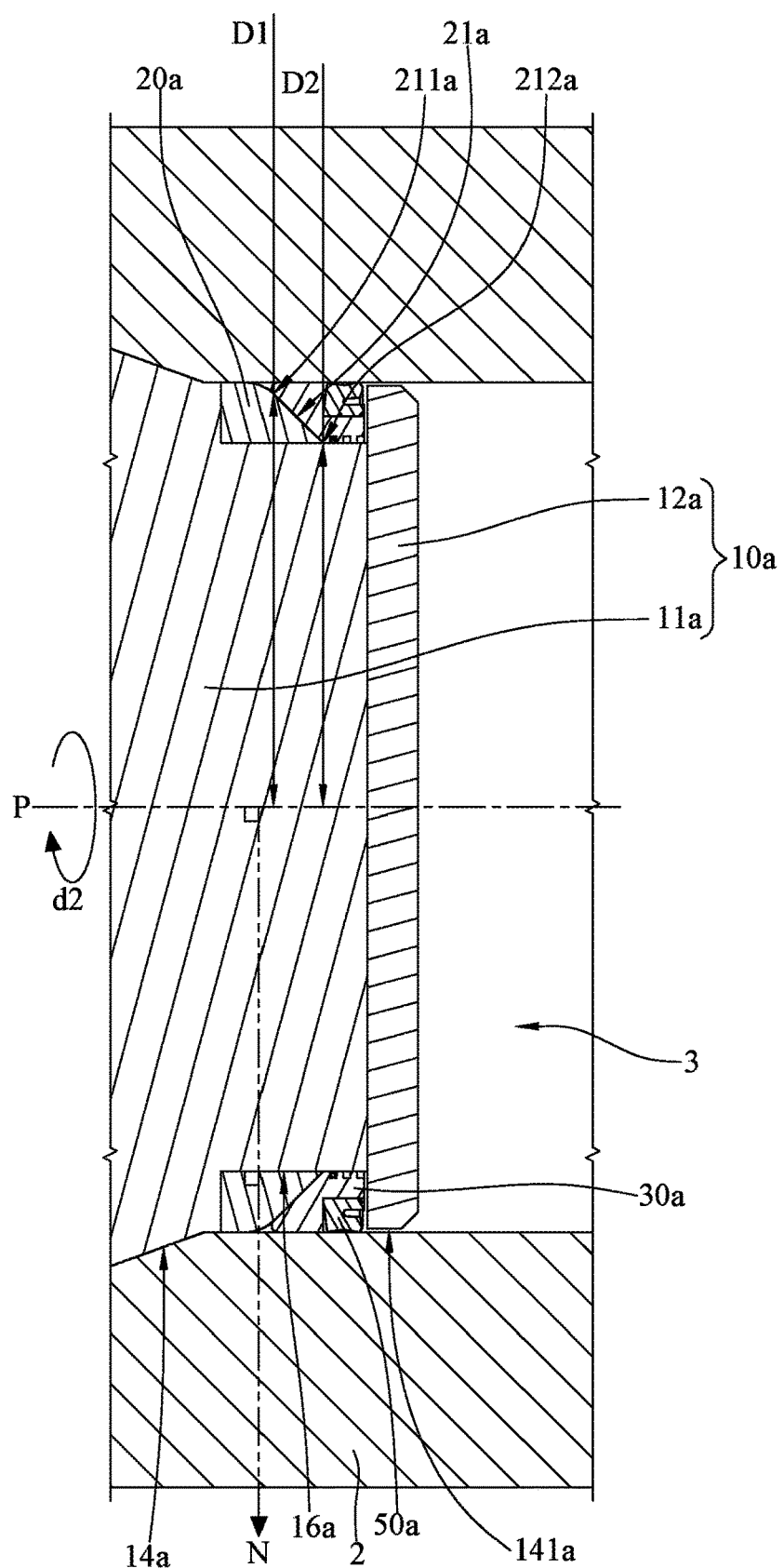
FIG. 4 is a partial cross-sectional view of the sealing plug assembly and the pressure tank in FIG. 1.
Figure 5:
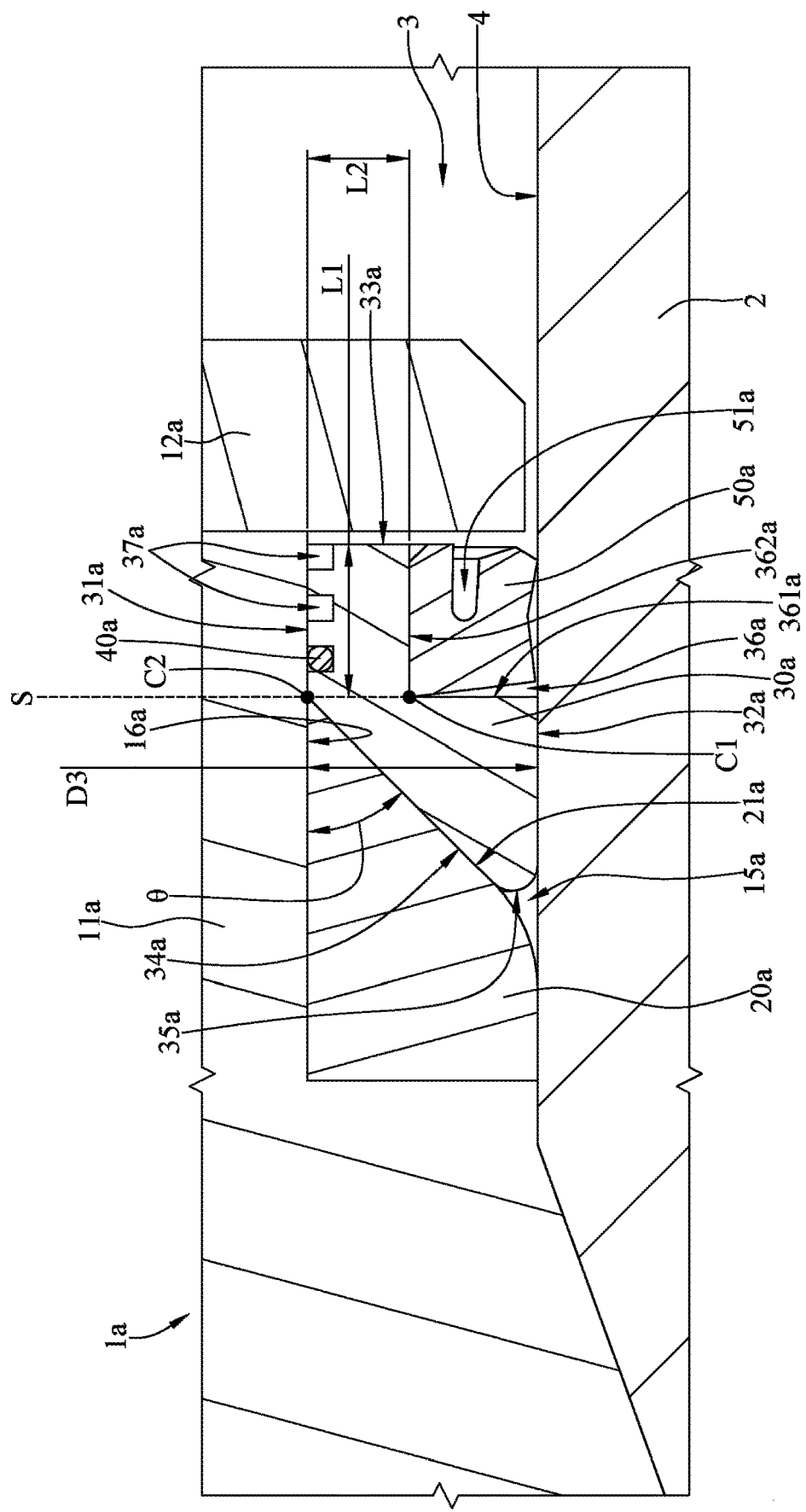
FIG. 5 is a partial enlarged cross-sectional view of the sealing plug assembly and the pressure tank in FIG. 4.

Then, please refer to FIG. 2 to FIG. 5. FIG. 2 is a perspective view of the sealing plug assembly in FIG. 1. FIG. 3 is an exploded view of the sealing plug assembly in FIG. 2. FIG. 4 is a partial cross-sectional view of the sealing plug assembly and the pressure tank in FIG. 1. FIG. 5 is a partial enlarged cross-sectional view of the sealing plug assembly and the pressure tank in FIG. 4.

The sealing plug assembly 1a includes a plug body 10a, a guide ring 20a, a first sealing ring 30a, a second sealing ring 40a and an elastic component 50a.

The plug body 10a has an annular outer surface 14a, a first annular recess 15a and a side surface 16a. The annular outer surface 14a faces away and surrounds a central line P of the plug body 10a. The annular outer surface 14a has a plug side 141a and an exposed side 142a opposite each other along the central line P of the plug body 10a. The first annular recess 15a is located between the plug side 141a and the exposed side 142a. When the sealing plug assembly 1a seals the opening 3 of the pressure tank 2, the plug side 141a and the first annular recess 15a are located in the pressure tank 2, and the exposed side 142a is located outside the pressure tank 2. The side surface 16a is located at a sides of the first annular recess 15a, and a normal line N of the side surface 16a is, for example, perpendicular to the central line P of the plug body 10a. In this embodiment, the plug body 10a includes a body part 11a and a cover part 12a. The cover part 12a is detachably mounted on the body part 11a along the central line P of the plug body 10a, and the cover part 12a and the body part 11a together form the first annular recess 15a. As such, after the cover part 12a has been detached from the body part 11a, the guide ring 20a and the first sealing ring 30a can be installed into or detached from the first annular recess 15a.

The guide ring 20a is sleeved on the plug body 10a and is located in the first annular recess 15a. The guide ring 20a has a first inclined surface 21a. The first inclined surface 21a is, for example, a smooth inclined surface. The first inclined surface 21a has a first side 211a and a second side 212a opposite each other. The first side 211a is located closer to the exposed side 142 of the annular outer surface 14a than the second side 212a, and a distance D1 between the first side 211a and the central line P of the plug body 10a is larger than a distance D2 between the second side 212a and the central line P of the plug body 10a.

The first sealing ring 30a is sleeved on the plug body 10a and is located in the first annular recess 15a, and the first sealing ring 30a is located farther away from the exposed side 142a than the guide ring 20a. The first sealing ring 30a has an inner surface 31a, an outer surface 32a, a lateral surface 33a, a second inclined surface 34a, a curved surface 35a, a second annular recess 36a, a first wall surface 361a, a second wall surface 362a and a plurality of annular grooves 37a.

The inner surface 31a of the first sealing ring 30a faces the side surface 16a, and the inner surface 31a has a length L1 along the central line P of the plug body 10a. The length L1 of the inner surface 31a is approximately, for example, 12 millimeter (mm). The outer surface 32a faces away from the inner surface 31a, and the outer surface 32a is, for example, parallel to the inner surface 31a. The lateral surface 33a and the second inclined surface 34a are located between the inner surface 31a and the outer surface 32a, and the lateral surface 33a and the second inclined surface 34a are respectively connected to two opposite sides of the inner surface 31a. The lateral surface 33a is, for example, perpendicular to the inner surface 31a.

In this embodiment, a ratio of a length L2 of the lateral surface 33a along a direction perpendicular to the central line P of the plug body 10a to a distance D3 between the outer surface 32a and the inner surface 31a along the direction perpendicular to the central line P of the plug body 10a ranges between, for example, 5:18 and 12:18. That is, the ratio of the length L2 to the distance D3 ranges between, for example, 5:18 and 12:18. For instance, the length L2 is 8 mm, and the distance D3 is 18 mm.

Two opposite sides of the curved surface 35a are respectively connected to the outer surface 31a and a side of the second inclined surface 34a away from the inner surface 31a; that is, the first sealing ring 30a has a round edge.

In this embodiment, the second inclined surface 34a of the first sealing ring 30a matches the first inclined surface 21a of the guide ring 20a, and an angle θ between the second inclined surface 34a and the side surface 16a approximately ranges between, for example, 30 degrees and 60 degrees, and the angle θ shown in FIG. 5 is approximately 45 degrees.

A side of the first wall surface 361a and a sides of the second wall surface 362a are connected to each other. Another side of the first wall surface 361a away from the second wall surface 362a is connected to the outer surface 32a, and a normal line of the first wall surface 361a is, for example, parallel to the central line P of the plug body 10. Another side of the second wall surface 362a away from the first wall surface 361a is connected to the lateral surface 33a, and a normal line of the second wall surface 362a is, for example, perpendicular to the central line P of the plug body 10. The first wall surface 361a and the second wall surface 362a together form a second annular recess 36a, and two adjacent sides of the second annular recess 36a are respectively connected to the outer surface 31a and the lateral surface 33a.

In this embodiment, a first connecting line C1 is formed at where the first wall surface 361a is connected to the second wall surface 362a, and a second connecting line C2 is formed at where the inner surface 31a is connected to the second inclined surface 34a. The first connecting line C1 and the second connecting line C2 are both located on the surface S which is perpendicular to the central line P of the plug body 10a.

The annular grooves 37a are located at the inner surface 31a, and the annular grooves 37a are arranged along a direction from the plug side 141a toward the exposed side 142a.

The second sealing ring 40a is disposed in one of the annular grooves 37a which is located closest to the exposed side 142a. The elastic component 50a is disposed in the second annular recess 36a, and the elastic component 50a has a notch 51a located at a side of the elastic component 50a facing away from the guide ring 20a.

Figure 6:
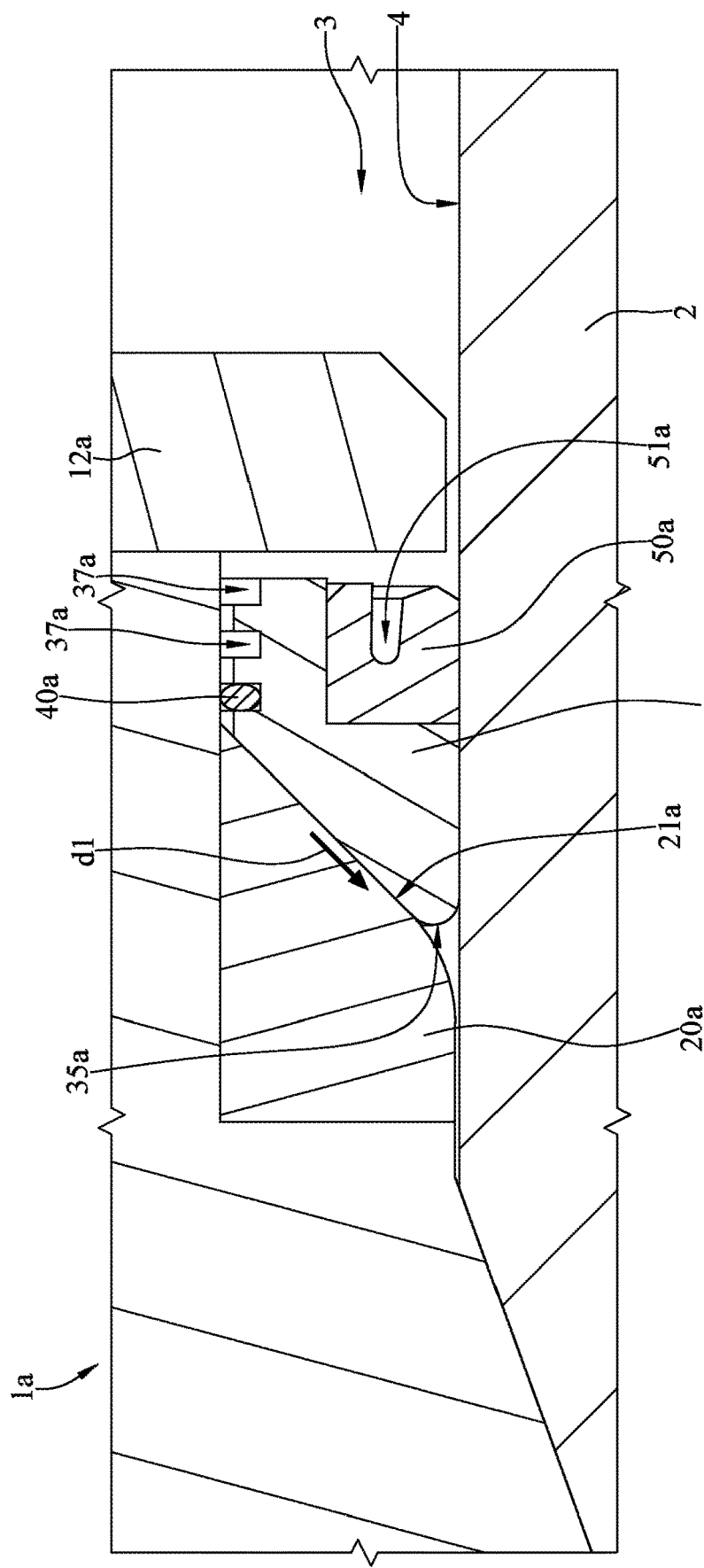
FIG. 6 is a partial enlarged cross-sectional view of the sealing plug assembly and the pressure tank in FIG. 4 when a first sealing ring is pushed by a high-pressure liquid.

Then, please refer to FIG. 6. FIG. 6 is a partial enlarged cross-sectional view of the sealing plug assembly and the pressure tank in FIG. 4 when a first sealing ring is pushed by a high-pressure liquid.

When the sealing plug assembly 1a seals the opening 3 of the pressure tank 2, and the high-pressure liquid is filled in the pressure tank 2, the high-pressure liquid enters into the notch 51a and the annular grooves 37a from a gap between the elastic component 50a and the cover part 12a. At this moment, the liquid will push the first sealing ring 30a and the elastic component 50a, such that the first sealing ring 30a is forced to move along the first inclined surface 21a toward a direction away from the central line P (shown in FIG. 4) of the plug body 10a. As a result, the first sealing ring 30a is stretched and tightly presses against a wall 4 which surrounds the opening 3 of the pressure tank 2, thereby sealing the pressure tank 2.

In this embodiment, the second sealing ring 40a is disposed in the annular groove 37a that is located closest to the exposed side 142a (shown in FIG. 2), such that the high-pressure liquid is only allowed to enter into the other annular grooves 37a located closer to the plug side 141a but not allowed to enter into a side of the second sealing ring 40a close to the exposed side 142a. This helps the pressure tank 2 to be kept sealed. However, the location of the second sealing ring 40a is not restricted; in some other embodiments, the second sealing ring 40a may be disposed in another annular grooves 37a, such as the annular grooves 37a that is located between the others.

In addition, the high-pressure liquid entering into the annular grooves 37a can provide a force on the first sealing ring 30a along the direction perpendicular to the central line P of the plug body 10a, such that the first sealing ring 30a is forced by the high-pressure liquid in two directions which are respectively parallel and perpendicular to the central line P; that is, the first sealing ring 30a is uniformly pushed by the high-pressure liquid. As such, the first sealing ring 30a can be moved along a straight direction d1 while it is moved along the first inclined surface 21a, and the first sealing ring 30a is prevented from being rotated with respect to the guide ring 20a around the central line P of the plug body 10a along a direction d2 (shown in FIG. 4). Therefore, the abrasion between the first sealing ring 30a and the guide ring 20a is decreased so that the lifespan of the first sealing ring 30a and the guide ring 20a is elongated.

Moreover, during the movement of the first sealing ring 30a, the rounded edge of the first sealing ring 30a can decrease the stress applied on the first sealing ring 30a when the first sealing ring 30a presses against the wall 4 of the pressure tank 2. Therefore, the edge of the first sealing ring 30a is prevented from being damaged, and which also helps to extend the lifespan of the first sealing ring 30a.

The elastic component 50a can be pushed and deformed by the high-pressure liquid, and the elastic component 50a can return to its original shape as the high-pressure liquid is depressurized. When the elastic component 50a returns to its original shape, it can force the first sealing ring 30a to move along the first inclined surface 21a to the position (as shown in FIG. 5) that is not in tight contact with the wall 4 of the pressure tank 2. At this moment, the sealing plug assembly 1a is easier to be unplugged from the opening 3 of the pressure tank 2.

Furthermore, the notch 51a of the elastic component 50a, that allows the high-pressure liquid to enter, can cause the elastic component 50a to be deformed harder to store more resilience force. Therefore, after the liquid is depressurized, the elastic component 50a can provide larger force to move the first sealing ring 30a. This is more efficient to return the first sealing ring 30a. However, the notch 51a on the elastic component 50a is optional; in some other embodiments, the elastic component may not have any notch.

Moreover, the first connecting line C1 and the second connecting line C2 are both located on the surface S perpendicular to the central line P of the plug body 10a, and the ratio of the length L2 to the distance D3 ranges approximately between 5:18 and 12:18, such that the first sealing ring 30a can be moved more smoothly by the guide ring 20a. Therefore, the first sealing ring 30a is much easier to be stretched or moved back to its original position, thereby further improving the effect in sealing the pressure tank 2 and making it more easily to unplug the sealing plug assembly 1a from the opening 3 of the pressure tank 2.

In this embodiment, the quantity of the annular grooves 37a of the first sealing ring 30a is not restricted. The following paragraphs will illustrate sealing plug assemblies of other embodiments that are similar to the sealing plug assembly 1a shown in FIG. 5. One of the differences between these embodiments is the quantity of the annular groove.

Figure 7:
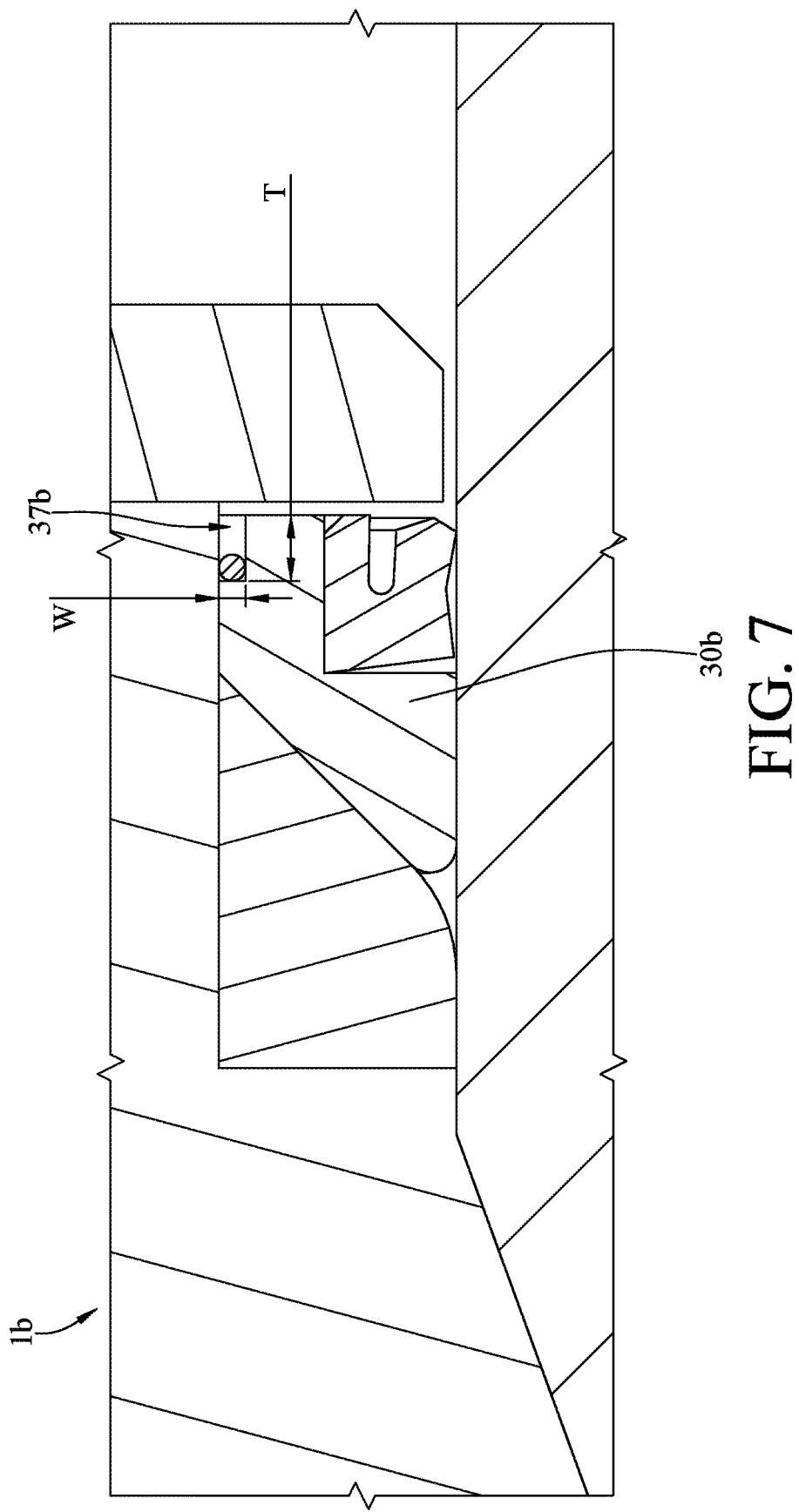
FIG. 7 is a partial enlarged cross-sectional view of a sealing plug assembly according to a second embodiment of the disclosure.

Please refer to FIG. 7. FIG. 7 is a partial enlarged cross-sectional view of a sealing plug assembly according to a second embodiment of the disclosure. This embodiment provides a sealing plug assembly 1b, and a first sealing ring 30b of the sealing plug assembly 1b only has one annular groove 37b. A depth T along a central line (e.g., central line P shown in FIG. 4) of a plug body 10b is approximately, for example, 5 mm, and a width W of the annular groove 37b along a direction perpendicular to the central line P of the plug body 10b is approximately, for example, 2 mm.

Figure 8:
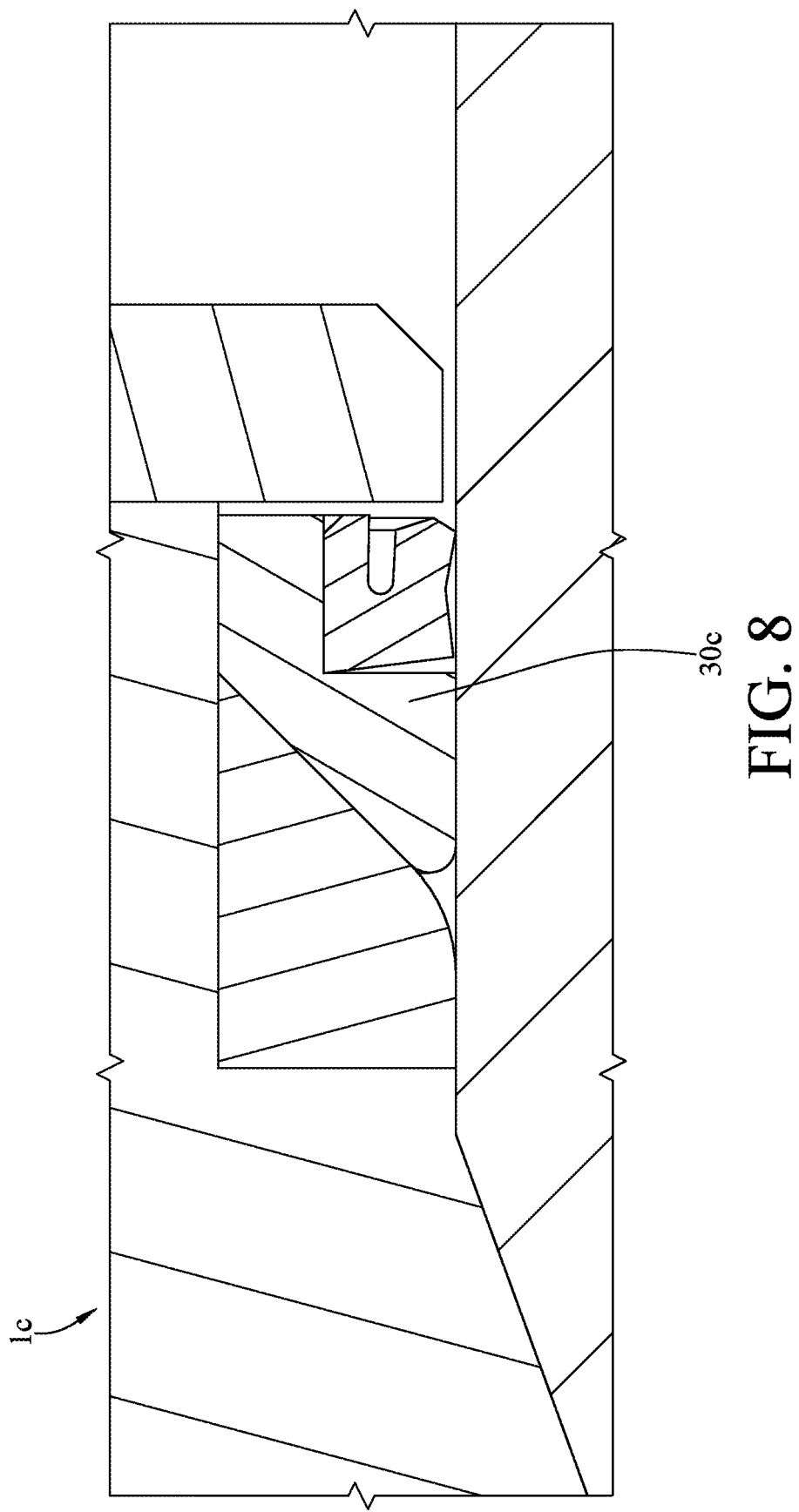
FIG. 8 is a partial enlarged cross-sectional view of a sealing plug assembly according to a third embodiment of the disclosure.

Then, please refer to FIG. 8. FIG. 8 is a partial enlarged cross-sectional view of a sealing plug assembly according to a third embodiment of the disclosure. This embodiment provides a sealing plug assembly 1c, and a first sealing ring 30c does not have any annular groove.

According to the sealing plug assemblies as discussed above, the first side of the first inclined surface is located farther away from the central line of the plug body than the second side of the first inclined surface, and the first sealing ring has the second inclined surface which matches the first inclined surface, such that when the sealing plug assembly is plugged into the opening of the pressure tank and experiences the pressure provided by the high press liquid in the pressure tank, the first sealing ring will be moved along the first inclined surface so as to move toward the direction away from the central line of the plug body. As such, the first sealing ring will be stretched and tightly presses against the wall which surrounds the opening of the pressure tank and thus sealing the pressure tank.

In addition, the high-pressure liquid entering into the annular grooves can provide a force to the first sealing ring along the direction perpendicular to the central line of the plug body, such that the first sealing ring is uniformly pushed by the high-pressure liquid. As such, the first sealing ring can be moved straightly moved while it is moved along the first inclined surface, and the first sealing ring is prevented from being rotated with respect to the guide ring around the central line of the plug body. Therefore, the abrasion between the first sealing ring and the guide ring is decreased so that the lifespan of the first sealing ring and the guide ring is elongated.

Moreover, during the movement of the first sealing ring, the rounded edge of the first sealing ring can decrease the stress applied on the first sealing ring when the first sealing ring presses against the wall of the pressure tank. Therefore, the edge of the first sealing ring is prevented from being damaged, and which also helps to extend the lifespan of the first sealing ring.

The elastic component can be pushed and deformed by the high-pressure liquid, and the elastic component can return to its original shape as the high-pressure liquid is depressurized. When the elastic component returns to its original shape, it can force the first sealing ring to move along the first inclined surface to the position that is not in tight contact with the wall of the pressure tank. At this moment, the sealing plug assembly is easier to be unplugged from the opening of the pressure tank.

Furthermore, the notch of the elastic component, that allows the high-pressure liquid to enter, can cause the elastic component deformed harder to store more resilience force. Therefore, after the liquid is depressurized, the elastic component can provide larger force to move the first sealing ring. This is more efficient to return the first sealing ring.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A sealing plug assembly, comprising:
a plug body, having an annular outer surface and a first annular recess, wherein the annular outer surface has a plug side and an exposed side opposite each other, and the first annular recess is located at the annular outer surface and is located between the plug side and the exposed side;
a guide ring, sleeved on the plug body and located in the first annular recess, wherein the guide ring has a first inclined surface, the first inclined surface has a first side and a second side opposite each other, the first side is located closer to the exposed side of the annular outer surface than the second side, and a distance between the first side and a central line of the plug body is larger than a distance between the second side and the central line of the plug body;

a first sealing ring, sleeved on the plug body and located in the first annular recess, wherein the first sealing ring is located farther away from the exposed side of the annular outer surface than the guide ring, the first sealing ring has a second inclined surface, and the second inclined surface matches the first inclined surface; and an elastic component, sleeved on the first sealing ring;

wherein the plug body has a side surface located at a side of the first annular recess, the first sealing ring further has an inner surface and at least one annular groove, the inner surface faces the side surface, a side of the inner surface is connected to the second inclined surface, and the at least one annular groove is located at the inner surface;

wherein the quantity of the at least one annular groove is plural, and the annular grooves are arranged along a direction from the plug side toward the exposed side.

2. The sealing plug assembly according to claim 1, further comprising a second sealing ring, wherein the second sealing ring is disposed in one of the annular grooves.

3. The sealing plug assembly according to claim 1, further comprising a second sealing ring, wherein the second sealing ring is disposed on one of the annular grooves which is located closest to the exposed side.

4. The sealing plug assembly according to claim 1, wherein an angle between the second inclined surface and the side surface ranges between 30 degrees and 60 degrees.

5. The sealing plug assembly according to claim 4, wherein the angle between the second inclined surface and the side surface is 45 degrees.

6. The sealing plug assembly according to claim 1, wherein the elastic component has a notch located at a side of the elastic component away from the guide ring.

7. A sealing plug assembly, comprising:

a plug body, having an annular outer surface and a first annular recess, wherein the annular outer surface has a plug side and an exposed side opposite each other, and the first annular recess is located at the annular outer surface and is located between the plug side and the exposed side;

a guide ring, sleeved on the plug body and located in the first annular recess, wherein the guide ring has a first inclined surface, the first inclined surface has a first side and a second side opposite each other, the first side is located closer to the exposed side of the annular outer surface than the second side, and a distance between the first side and a central line of the plug body is larger than a distance between the second side and the central line of the plug body;

a first sealing ring, sleeved on the plug body and located in the first annular recess, wherein the first sealing ring is located farther away from the exposed side of the annular outer surface than the guide ring, the first sealing ring has a second inclined surface, and the second inclined surface matches the first inclined surface; and an elastic component, sleeved on the first sealing ring;

wherein the plug body has a side surface located at a side of the first annular recess, the first sealing ring further has an inner surface and at least one annular groove, the inner surface faces the side surface, a side of the inner surface is connected to the second inclined surface, and the at least one annular groove is located at the inner surface;

wherein the first sealing ring further has an outer surface and a curved surface, the outer surface faces away from the inner surface, two opposite sides of the curved surface are respectively connected to the outer surface and a side of the second inclined surface away from the inner surface.

8. The sealing plug assembly according to claim 7, wherein the first sealing ring further has a lateral surface and a second annular recess, the lateral surface and the second inclined surface is located between the inner surface and the outer surface, the lateral surface and the second inclined surface are respectively connected to two opposite sides of the inner surface, two adjacent sides of the second annular recess are respectively connected to the outer surface and the lateral surface, and the elastic component is disposed in the second annular recess.

9. The sealing plug assembly according to claim 8, wherein the first sealing ring further has a first wall surface and a second wall surface connected to each other, the first wall surface and the second wall surface together form the second annular recess, a side of the first wall surface away from the second wall surface is connected to the outer surface, a side of the second wall surface away from the first wall surface is connected to the lateral surface, a first connecting line is formed at where the first wall surface is connected to the second wall surface, a second connecting line is formed at where the inner surface is connected to the second inclined surface, and the first connecting line and the second connecting line are located on a same surface which is perpendicular to the central line of the plug body.

10. The sealing plug assembly according to claim 9, wherein a ratio of a length of the lateral surface along a direction perpendicular to the central line of the plug body to a distance between the inner surface and the outer surface along the direction perpendicular to the central line of the plug body ranges between 5:18 and 12:18.

11. The sealing plug assembly according to claim 7, further comprising a second sealing ring, wherein the second sealing ring is disposed in the at least one annular groove.

12. The sealing plug assembly according to claim 7, wherein an angle between the second inclined surface and the side surface ranges between 30 degrees and 60 degrees.

13. The sealing plug assembly according to claim 12, wherein the angle between the second inclined surface and the side surface is 45 degrees.

14. The sealing plug assembly according to claim 7, wherein the elastic component has a notch located at a side of the elastic component away from the guide ring.

* * * * *